United States Patent
Yoon et al.

(10) Patent No.: US 7,224,647 B2
(45) Date of Patent: May 29, 2007

(54) METHOD, APPARATUS, AND MEDIUM FOR CONTROLLING A SERVO USING A DETECTED HEADER FIELD SIGNAL, AND METHOD, APPARATUS, AND MEDIUM FOR DETECTING THE HEADER FIELD SIGNAL

(75) Inventors: Yong-seok Yoon, Gyeonggi-do (KR); Soo-yul Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 652 days.

(21) Appl. No.: 10/624,556

(22) Filed: Jul. 23, 2003

(65) Prior Publication Data

US 2004/0141433 A1    Jul. 22, 2004

(30) Foreign Application Priority Data

Jul. 23, 2002    (KR)    ............... 10-2002-0043283

(51) Int. Cl.
    *G11B 7/00*    (2006.01)
(52) U.S. Cl. .............. 369/44.34; 369/124.15; 369/47.27
(58) Field of Classification Search .......... 369/44.27, 369/44.28, 44.29, 44.11, 44.34, 44.35, 44.26, 369/53.27, 124.15, 47.27
    See application file for complete search history.

(56) References Cited

U.S. PATENT DOCUMENTS 4,785,442 A * 11/1988 Ohtake et al. ........... 369/44.26

6,178,145 B1 * 1/2001 Hayashi et al. .......... 369/44.29

(Continued)

FOREIGN PATENT DOCUMENTS

JP    10-247325    9/1998

(Continued)

OTHER PUBLICATIONS

*Reference AA (U.S. 6,614,730) is substantially equivalent to Reference AJ (JP 2000-353318).

(Continued)

*Primary Examiner*—Nabil Hindi
(74) *Attorney, Agent, or Firm*—Stein, McEwen & Bui, LLP

(57) ABSTRACT

A method, apparatus, and computer readable medium controlling a servo of a recording and/or reproducing apparatus, using a detected header field signal. An optical recording and/or reproducing apparatus includes a playback signal detector that detects a playback signal and a track error signal from information recorded on a DVD-RAM disc, as picked up by a pickup. A header field signal detecting circuit detects a header field signal by comparing a sampled playback signal for a signal representing the presence of a header field with a reference level and holding the comparison result for a predetermined period of time to generate the header field signal. Accordingly, a tracking servo can be stably controlled by using a tracking driving signal that is not affected by the presence of a header. Also, in a seek mode, the track error signal can be held based on the header field signal to generate a track count signal that is similarly not affected by the header. As a result, the number of tracks on the DVD-RAM disc can be accurately counted by using the track error signal.

29 Claims, 5 Drawing Sheets

U.S. PATENT DOCUMENTS 6,614,740 B1    9/2003    Park et al.

FOREIGN PATENT DOCUMENTS

| JP | 10-275338 | 10/1998 |
| JP | 11-328690 | 11/1999 |
| JP | H11-316957 | 11/1999 |
| JP | 2000-353318 | 12/2000 |

OTHER PUBLICATIONS

Office Action issued in Japanese Patent Application No. 2003-194845 on Jan. 17, 2006.

* cited by examiner

TE

TRACK COUNT SIGNAL

TE

JHD

TRACK COUNT SIGNAL

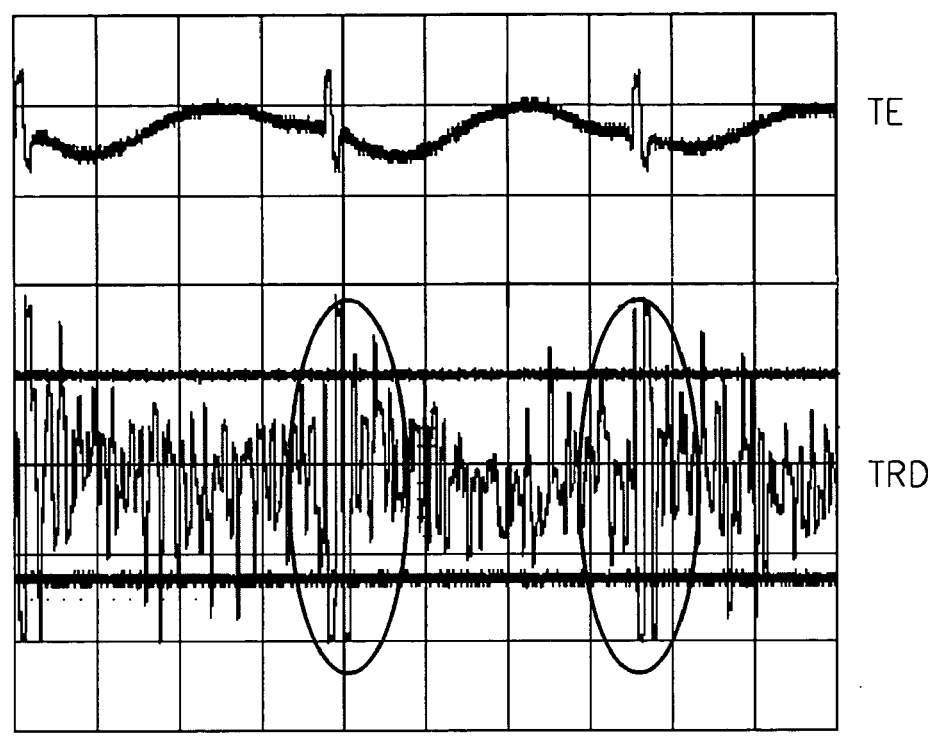
FIG. 9A   TE
FIG. 9B   TRD
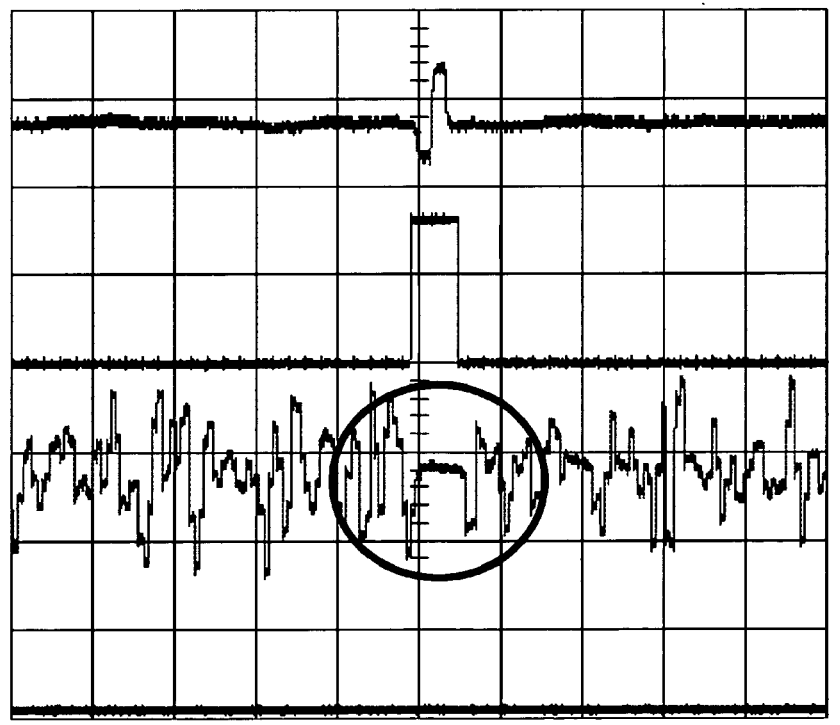
FIG. 10A   TE
FIG. 10B   JHD
FIG. 10C   TRD

METHOD, APPARATUS, AND MEDIUM FOR CONTROLLING A SERVO USING A DETECTED HEADER FIELD SIGNAL, AND METHOD, APPARATUS, AND MEDIUM FOR DETECTING THE HEADER FIELD SIGNAL

CROSS-REFERENCE TO RELATED APPLICATIONS

This application claims the priority of Korean Patent Application No. 2002-43283 filed on Jul. 23, 2002 in the Korean Intellectual Property Office, the entire disclosure of which is incorporated herein by reference.

BACKGROUND OF THE INVENTION

1. Field of the Invention

The present invention relates to a method, apparatus, and medium for controlling a servo using a detected header field signal in an optical recording and/or reproducing apparatus, and a method, apparatus, and medium controlling the detection of the header field signal. More particularly, the present invention relates to a method, apparatus, and medium for controlling a servo using the header field signal, and a method, apparatus, and medium controlling the detecting of the signal, representing the header field, recorded on a DVD-RAM disc.

2. Description of the Related Art

A digital versatile disc-random access memory (DVD-RAM) disc includes an embossed area, containing an embossed pit sequence, and a recording/reproducing area where data can be recorded in the form of a groove wobble and/or a land wobble. The recording/reproducing area includes a plurality of sectors, each having an embossed header area including a header field. In such a DVD-RAM disc, a signal indicating the presence of the header field may appear in other signal detections. The presence of the header field signal in the tracking error signal adversely affects control of a tracking servo, and similarly adversely affects the counting of the number of tracks, as performed in a seek mode operation of the DVD-RAM disc. Thus, it would be preferential to remove the effects of the header field signal in the tracking error signal.

Unlike operations performed during a reproduction mode operation, in a seek mode operation, which may include search or track jump operations, an optical pickup head jumps tracks, counts the number of tracks jumped, and moves to a target track. Here, it is very important to accurately count the number of tracks. However, in a case of a DVD-RAM, it is difficult to accurately count the number of tracks because of the presence of the header area and the correspondingly inadvertently detected header field.

Further, typically a tracking servo follows a track using a track error signal in the recording/reproducing operation of the DVD-RAM. However, as noted above, the track error signal can be affected by the presence of the header field, resulting in deterioration of the stability of the tracking servo, and ultimately deterioration of a characteristic of a playback signal. As seen in FIG. 1, before the tracking servo is controlled, the track error signal is illustrated as also containing a signal representing the presence of the header field. As shown in FIG. 2, after the tracking servo is controlled, the header continues to affect the track error signal. Thus, it would be preferential to have a method, apparatus, or medium to control the tracking servo to follow the track error signal without being affected by the header field.

In addition, it is noted that in an event that a header identification (ID) is not read and a header field is not properly predicted, due to instability in the system, or if a playback signal detector does not properly detect the header field, in existing optical recording and/or reproducing apparatuses, the stability of servo control becomes deteriorated. It would be preferential to have a method, apparatus, or medium for stable servo control through proper header field detection.

SUMMARY OF THE INVENTION

Accordingly, it is an aspect of the present invention to perform stable servo control of a recording and/or reproducing apparatus by generating a header field signal, representing a header field, from a playback signal, and use the same to reduce the effect of the header field on recording and/or reproducing operations.

It is an additional aspect of the present invention to generate a header field signal representing a header field from a playback signal when the header field is not estimated or not detected due to instability in a system. A further aspect of the present invention is to control a servo such that the number of tracks of a recording medium is counted accurately by using a generated header field signal. Another aspect of the present invention is to accurately control a tracking servo by generating a tracking driving signal that is unaffected by the presence of a header, using a generated header field signal. Still another aspect of the present invention is to control a servo by generating a tracking driving signal that is unaffected by the presence of a header using a generated header field signal in a reproduction mode, and accurately counting the number of tracks upon a movement of a pickup to a desired track using the generated header field signal in a seek mode.

Additional aspects and advantages of the invention will be set forth in part in the description which follows and, in part, will be obvious from the description, or may be learned by practice of the invention.

To achieve the above and/or other aspects of the present invention, there is provided a recording and/or reproducing method, including sampling a playback signal, from light reflecting off a recording medium, for a signal representing a header field, included in the playback signal, and comparing the sampled signal representing the presence of a header field with a reference level, holding a result of the comparison for a predetermined period of time to generate a header field signal, and providing the header field signal to a servo driving unit to generate a servo driving signal to control a servo of a recording and/or reproducing apparatus.

To achieve the above and/or still other aspects of the present invention, there is provided a recording and/or reproducing apparatus, including a sampling unit to sample a playback signal, from light reflecting off a recording medium, for a signal representing the presence of a header field, a comparing unit to compare the signal representing the presence of a header field with a reference level and to output a comparison signal, and a holding unit to hold the comparison signal to generate a header field signal for a servo driving unit to generate a servo driving signal to control a servo of the recording and/or reproducing apparatus.

To achieve the above and/or still other aspects of the present invention, there is provided a method of controlling a servo in an optical recording and/or reproducing apparatus, including sampling a playback signal, from a pickup detecting light reflecting off a recording medium, for a signal representing the presence of a header field, comparing the signal representing the presence of a header field with a reference level and holding the comparison result for a predetermined period of time to generate a header field signal, holding a track error signal generated by the pickup, based on the light detected by the pickup, during the generation of the header field signal and generating a track count signal in a seek mode operation of the recording and/or reproducing apparatus, and generating a seek driving signal to pickup information from a desired track of the recording medium by using the track count signal.

To achieve the above and/or still other aspects of the present invention, there is provided a method of controlling a servo in an optical recording and/or reproducing apparatus, including sampling a playback signal, from a pickup detecting light reflecting off a recording medium, for a signal representing the presence of a header field, comparing the signal representing the presence of a header field with a reference level and holding the comparison result for a predetermined period of time to generate a header field signal, and generating a corrected tracking driving signal for a tracking of the recording medium which ignores the effect of a signal in the track error signal, generated by the pickup based on the light detected by the pickup, representing the presence of a header field, by holding an uncorrected tracking driving signal a period of time based on the header field signal.

To achieve the above and/or still other aspects of the present invention, there is provided a method of controlling a servo for an optical recording and/or reproducing apparatus, including sampling a playback signal, from a pickup detecting light reflecting off a recording medium, for a signal representing the presence of a header field, comparing the signal representing the presence of a header field with a reference level and holding the comparison result for a predetermined period of time to generate a header field signal, generating a corrected tracking driving signal for a tracking of the recording medium which ignores the effect of a signal in the track error signal, generated by the pickup based on the light detected by the pickup, representing the presence of a header field, by holding an uncorrected tracking driving signal a period of time based on the header field signal, in a reproduction mode operation, and generating a track count signal by holding the track error signal based on the header field signal and generating a seek driving signal to pickup information from a desired track of the recording medium by using the track count signal, in a seek mode operation.

To achieve the above and/or still other aspects of the present invention, there is provided a apparatus for controlling a servo in an optical recording and/or reproducing apparatus, including a header field signal detecting circuit to compare a signal, from a pickup detecting light reflecting off a recording medium and including a signal representing the presence of a header field, with a reference level, and to hold the comparison result for a predetermined period of time to generate a header field signal, and a seeking unit to generate a track count signal by holding a track error signal, generated by the pickup based on the light detected by the pickup, based on the header field signal, and to generate a seek driving signal to pickup information from a desired track of the recording medium by using the track count signal, in a seek mode.

To achieve the above and/or still other aspects of the present invention, there is provided a apparatus for controlling a servo in an optical recording and/or reproducing apparatus, including a header field signal detecting circuit to compare a signal, from a pickup detecting light reflecting off a recording medium and including a signal representing the presence of a header field signal, with a reference level, and to hold the comparison result for a predetermined period of time to generate a header field signal, a tracking servo to generate a corrected tracking driving signal for tracking of the recording medium which ignores the effect of a signal in the track error signal, generated by the pickup based on light detected by the pickup, representing the presence of a header field, by holding an uncorrected tracking driving signal based on the header field signal.

To achieve the above and/or still other aspects of the present invention, there is provided a apparatus for controlling a servo in an optical recording and/or reproducing apparatus, including a header field signal detecting circuit to compare a signal, from a pickup detecting light reflecting off a recording medium and including a signal representing the presence of a header field signal, with a reference level, and to hold the comparison result for a predetermined period of time to generate a header field signal, a tracking servo to generate a corrected tracking driving signal for tracking of the recording medium which ignores the effect of a signal in the track error signal, generated by the pickup based on light detected by the pickup, representing the presence of a header field, by holding an uncorrected tracking driving signal based on the header field signal, in a reproduction mode, and a seeking unit to generate a track count signal by holding a track error signal, generated by the pickup based on the light detected by the pickup, based on the header field signal, and to generate a seek driving signal to pickup information from a desired track of the recording medium by using the track count signal, in a seek mode.

Lastly, to achieve the above and/or other aspects of the present invention, there is also provided a medium including computer readable code controlling a computer to control the execution of aforementioned methods, or a medium including computer readable code controlling a computer to control the operation of the aforementioned apparatuses.

These, together with other aspects and/or advantages that will be subsequently apparent, reside in the details of construction and operation as more fully hereinafter described and claimed, reference being had to the accompanying drawings forming a part thereof.

BRIEF DESCRIPTION OF THE DRAWINGS

These and/or other aspects and advantages of the invention will become apparent and more readily appreciated from the following description of the preferred embodiments, taken in conjunction with the accompanying drawings of which:

FIGS. 9A–9B illustrate tracking related signals including a header field signal; and FIGS. 10A–10C illustrate tracking related signals and a header field signal generated by a tracking servo shown in FIG. 3, according to an embodiment of the present invention.

DETAILED DESCRIPTION OF THE PREFERRED EMBODIMENTS

Figure 1:
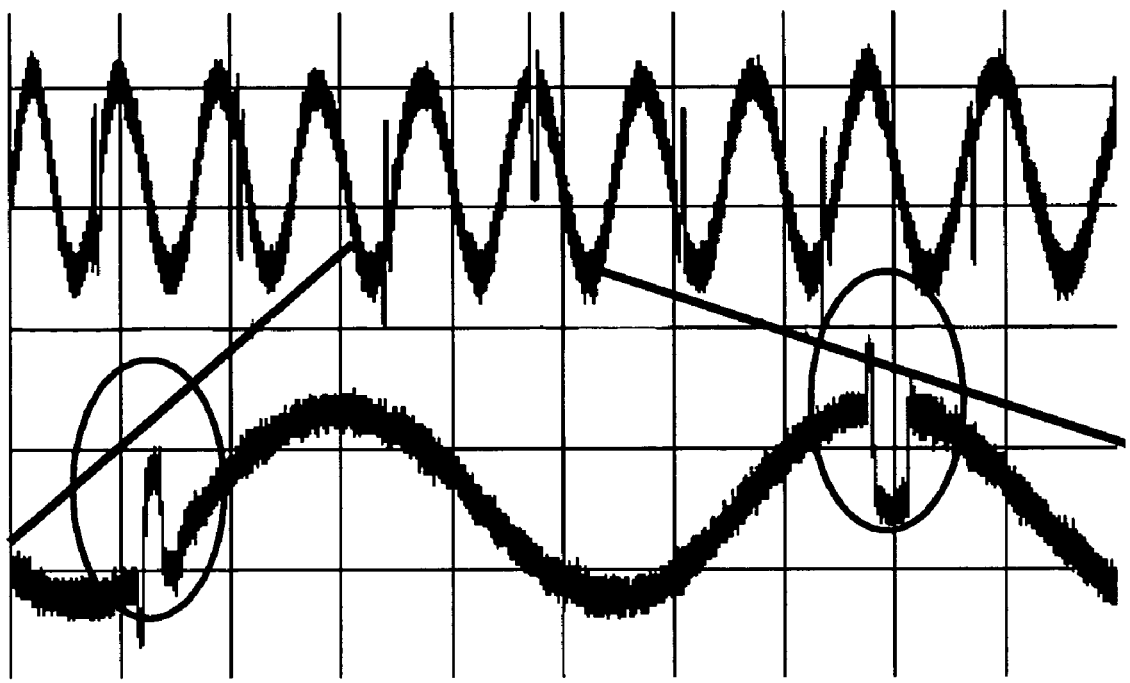
FIG. 1 illustrates a track error signal affected by a header field before tracking is controlled.
Figure 2:
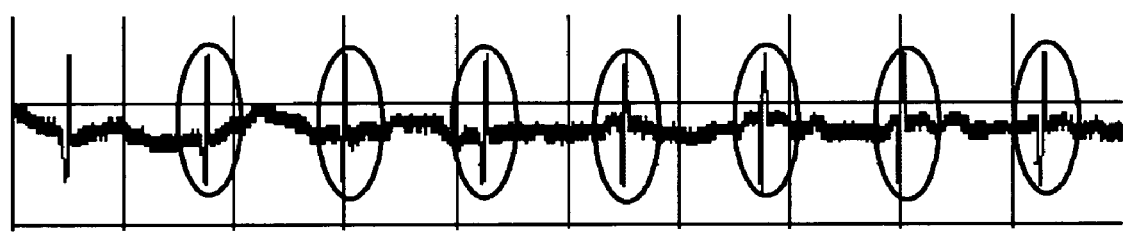
FIG. 2 illustrates a track error signal affected by a header field after tracking is controlled.

Reference will now be made in detail to the present embodiments of the present invention, examples of which are illustrated in the accompanying drawings, wherein like reference numerals refer to like elements throughout. The embodiments are described below in order to explain the present invention by referring to the figures.

Figure 3:
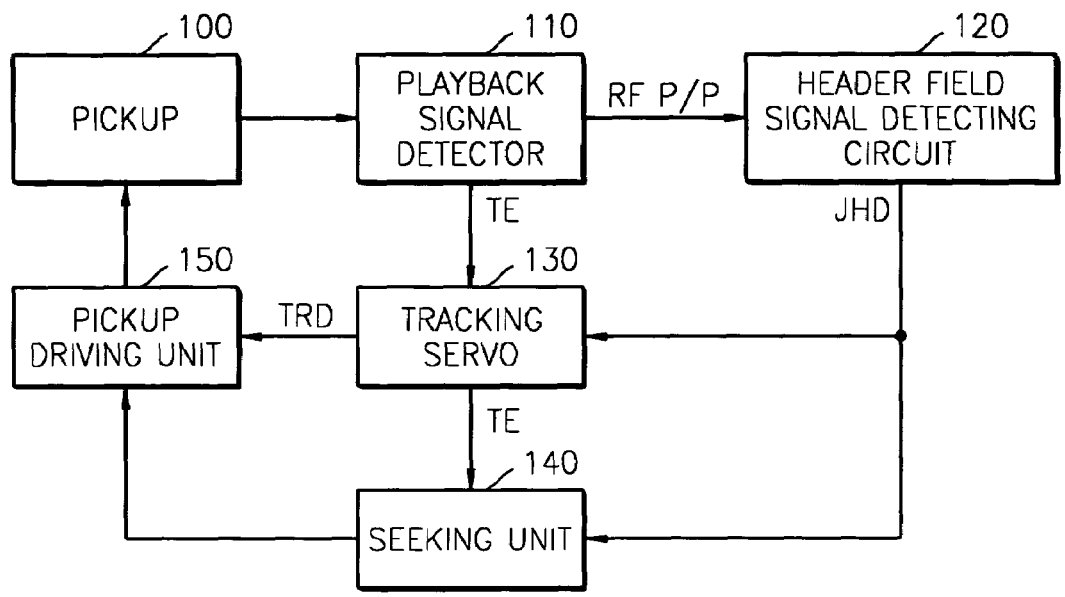
FIG. 3 is a schematic block diagram of an optical recording and/or reproducing apparatus including a header field signal detecting circuit according to an embodiment of the present invention.

FIG. 3 is a schematic block diagram of an optical recording and/or reproducing apparatus including a header field signal detecting circuit according to embodiments of the present invention. Referring to FIG. 3, a pickup 100 picks up information recorded on a recording medium, i.e., a DVD-RAM disc. A playback signal detector 110 detects a playback signal, corresponding to information picked up by the pickup 100. A playback detector 110 can be used to detect a track error signal. The playback detector 110 may be a photodiode (not shown) of the pickup 100 being divided into four pieces, with the four pieces being divided with a piece at the top left, a piece at the top right, a piece at the bottom right, and a piece at the bottom left, respectively denoted by pieces A, B, C, and D. The playback signal detector 110 detects a difference signal between a sum signal (A+D) of electrical signals output from the photodiode pieces A and D and a sum signal (B+C) of electrical signals output from the photodiode pieces B and C. The difference signal ((A+D)−(B+C)) is called a track error signal TE or a radio frequency push-pull (RF P/P) signal.

A header field signal detecting circuit 120 generates a signal JHD representing the presence of a header field (hereinafter referred to as a header field signal JHD) from the playback signal (RF P/P) signal output from the playback signal detector 110, and transmits the header field signal JHD to a tracking servo 130 and a seeking unit 140. The tracking servo 130 generates a tracking driving signal TRD based on the track error signal TE and the header field signal JHD. Here, the tracking driving signal TRD is "held" during a period of the track error signal TE representing the presence of a header field. In this manner, the effect of the header field signal in the track error signal TE will be neutralized, and the tracking servo 130 can accurately follow a track by using the tracking driving signal TRD.

The seeking unit 140 detects a track count signal from the track error signal TE obtained by using the header field signal JHD, to exclude the effect of the header field, and generates a seek driving signal based on the track count signal. A pickup driving unit 150 can control the pickup 100 during reproduction stop mode operations according to a speed factor by using the tracking driving signal TRD generated by the tracking servo 130, or can control the pickup 100 during a seek mode operation, including functions such as track jump and search operations, using a seek driving signal generated by the seeking unit 140. The tracking servo 130 and the seeking unit 140, together, may be referred to as a servo driving unit.

Figure 4:
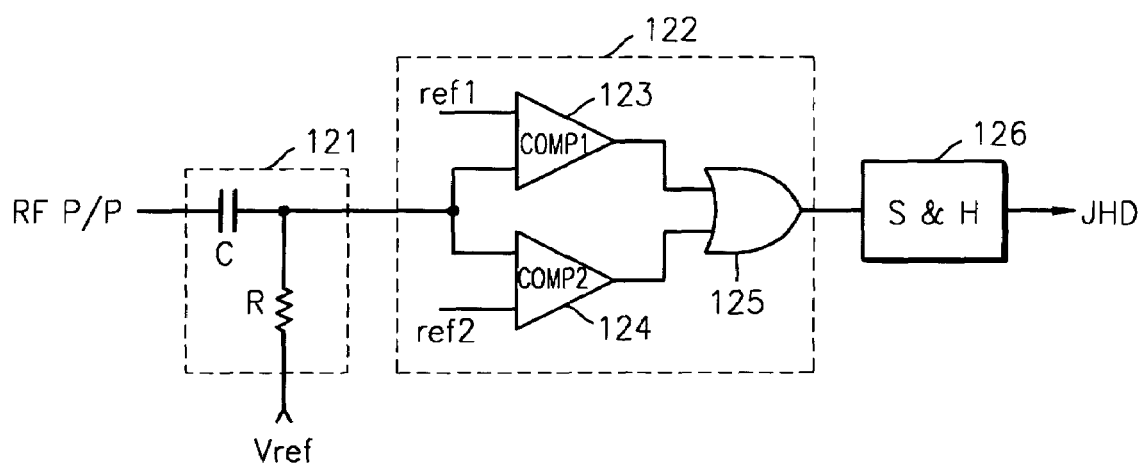
FIG. 4 is a circuit diagram of a header field signal detecting circuit according to an embodiment of the present invention.
Figure 5A:
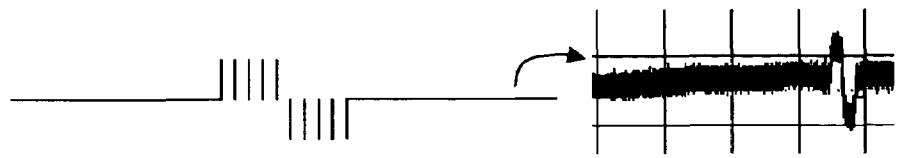
FIGS. 5A–5D illustrate waveforms of outputs of the header field signal detecting circuit shown in FIG. 4, according to an embodiment of the present invention.
Figure 5B:
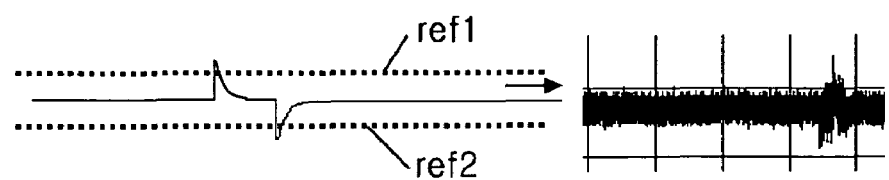
Figure 5C:
Figure 5D:
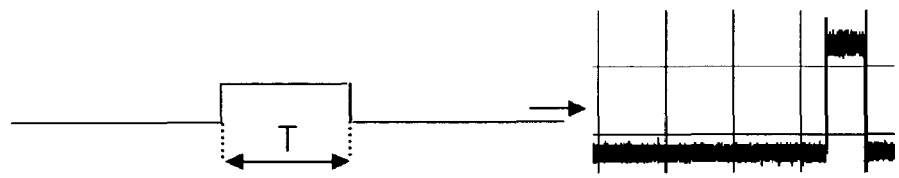

FIG. 4 is a block diagram of a header field signal detecting circuit according to an embodiment of the present invention. Referring to FIGS. 4 and 5A–5D, since the signal present in the track error signal TE representing the presence of the header field has a higher frequency than other signals in the track error signal TE, as shown in FIG. 5A, the signal representing the presence of the header field can be sampled by using a high-pass filter HPF 121. The HPF 121 high-pass filters the playback signal shown in FIG. 5A and outputs the high-pass filtered signal, as shown in FIG. 5B. A first comparator 123 (COMP1), of a comparing unit 122, compares the high-pass filtered signal output from the HPF 121 and a first reference level ref1 to obtain a first comparison signal, which is output to an OR gate 125. A second comparator 124 (COMP2) compares the high-pass filtered signal output from the HPF 121 and a second reference level ref2 to obtain a second comparison signal, which is output to the OR gate 125. The OR gate 125 performs an OR operation on the first and second comparison signals to output an output signal, shown in FIG. 5C, to a sample and hold (S & H) unit 126. The S & H unit 126 holds the output of the OR gate 125 to output the header field signal JHD, shown in FIG. 5D. An activation period T of the header field signal JHD shown in FIG. 5D is set to a predetermined period of time. For example, the activation period T may be set to about double a period of time, from a point of time when the first comparison signal is output from the first comparator 123 to a point of time when the second comparison signal is output from the second comparator 124. Also, the first reference level ref1 is set to be lower than a top level of the playback signal while the second reference level ref2 is set to be higher than a bottom level of the playback signal.

In a DVD-RAM disc, in a seek mode operation, including functions such as search and track jump operations, the number of tracks on the disc are counted, to properly perform the seek operation. Thus, the number of tracks has to be accurately counted.

Figure 6A:
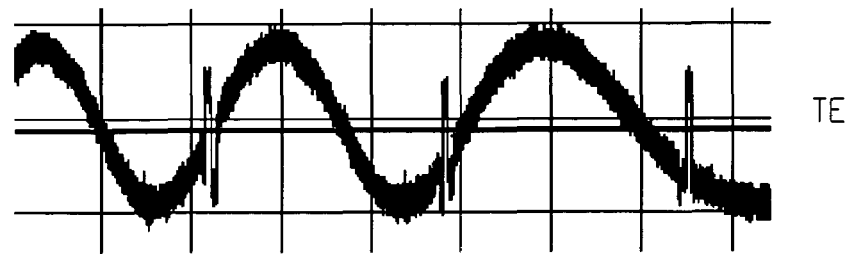
FIGS. 6A–6B illustrate a track error signal and a track count signal used in a seeking unit shown in FIG. 3, according to an embodiment of the present invention.
Figure 6B:
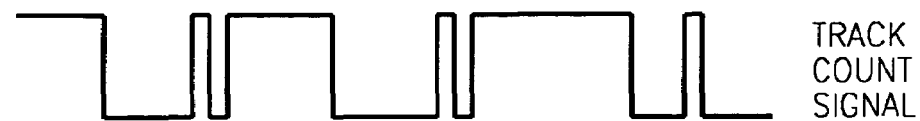

FIG. 6A shows a track error signal TE affected by header fields, and FIG. 6B shows a track count signal corresponding to the track error signal TE affected by the header fields. Thus, in a case of a DVD-RAM disc, it is difficult to accurately count tracks because of the presence of the header field signals. To solve this problem, a track counting circuit shown in FIG. 7 can be used so as to count the number of tracks regardless of the header field influences. In other words, the tracking counting circuit can remove the effect of header fields from the track error signal TE, generate the track count signal, and accurately count the number of tracks.

Figure 7:
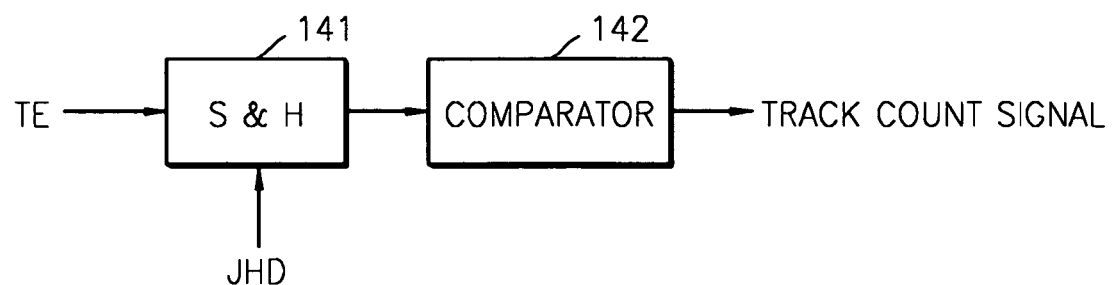
FIG. 7 is a block diagram of a track counting circuit used in the seeking unit shown in FIG. 3, according to an embodiment of the present invention.
Figure 8A:
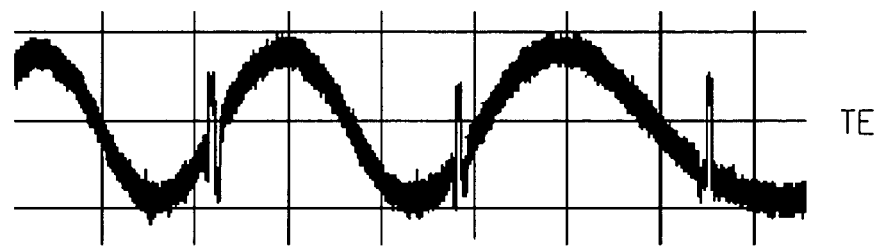
FIGS. 8A–8C illustrate waveforms of outputs of the track counting circuit shown in FIG. 7, according to an embodiment of the present invention.
Figure 8B:
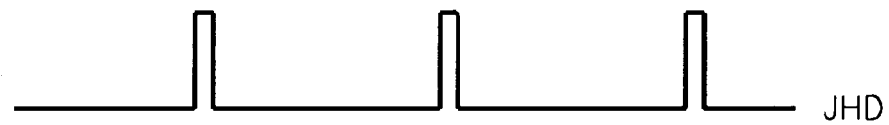
Figure 8C:
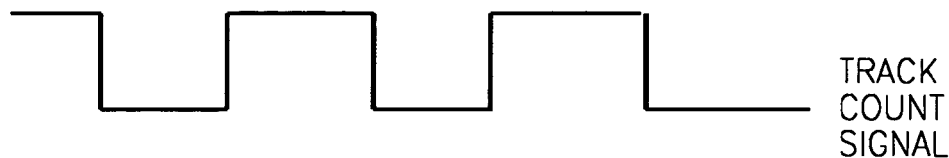

FIG. 7 is a block diagram of a track counting circuit that can be used in the seeking unit 140 shown in FIG. 3, according to an embodiment of the present invention. Referring to FIG. 7, an S & H unit 141 samples and holds a track error signal TE, shown in FIG. 8A, output from the playback signal detector 110, for a period of time when a header field signal JHD is generated, and then outputs the track error signal TE to a comparator 142. The comparator 142 compares an output of the S & H unit 141 and a reference level (e.g., a center level) to generate a track count signal, shown in FIG. 8C, which is not affected by the header field signal. Since the number of tracks can be accurately counted by using the track count signal, errors due to miscounting can be reduced in the seek mode operation, which results in increasing the efficiency of the seek operation.

If the tracking servo 130 does not correct for the effect of the header field presence, the signal in a track error signal TE representing the presence of the header field, shown in FIG. 9A, will be regarded as an error in a track upon the generation of the tracking driving signal TRD, as shown in FIG. 9B. The tracking servo 130 follows a track using the tracking driving signal TRD. Thus, if the effect of the header field is not corrected for, tracking servo control stability will be reduced and the characteristic of a playback signal will be deteriorated.

In order to overcome this problem, even though the tracking servo 130 may receive a track error signal TE containing a header field signal, as shown in FIG. 10A, the tracking servo 130 can "hold" a tracking driving signal TRD during the period of time the header field signal JHD is present, as shown in FIGS. 10B and 10C. Thus, the tracking servo 130 can perform tracking using a header field signal JHD and a tracking driving signal TRD to compensate for the effect of the presence of a header field.

As described above, according to the present invention, in a seek mode operation, including search and track jump operations, while performing tracking, the number of tracks can be accurately counted and a stable servo control can be guaranteed.

In addition, even in a case where a header field is not estimated or is not detected due to instability in a system, servo control, which is not always affected by a header, can be performed, using a generated header field signal.

Embodiments of the present invention may be embodied in a general purpose digital computer, or computers, by running a program from a computer readable medium, including but not limited to storage media such as magnetic storage media (e.g., ROMs, floppy discs hard discs, etc.), optically readable media (e.g., CD-ROMs, DVDs, etc.) and carrier waves (e.g., transmissions over the Internet). The computer readable recording medium can also be dispersively installed in a computer system connected to a network, and stored and executed as a computer readable code by a distributed computing environment.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A recording and/or reproducing method, the method comprising:
   sampling a playback signal, from light reflecting off a recording medium, for a signal representing a header field, included in the playback signal; and
   comparing the sampled signal representing the presence of the header field with a first reference level and outputting a first comparison signal, comparing the sampled signal representing the presence of the header field with a second reference level and outputting a second comparison signal, holding the first and second comparison signals for a predetermined period of time to generate a header field signal, and providing the header field signal to a servo driving unit to generate a servo driving signal to control a servo of a recording and/or reproducing apparatus.

2. The method of claim 1, wherein in the sampling of the playback signal is accomplished by high-pass filtering the playback signal.

3. The method of claim 1, wherein the recording medium is a DVD-RAM disc.

4. The method of claim 1, wherein the first reference level is set to be lower than a top level of the playback signal and the second reference level is set to be higher than a bottom level of the playback signal.

5. The method of claim 1, wherein the predetermined period of time is Set to be greater than a period of time from a point of time when the first comparison signal is output to a point of time when the second comparison signal is output.

6. The method of claim 1, wherein the recording and/or reproducing apparatus comprises a pickup using light to pick up information recorded on an optical disc having an embossed area and a recording/reproducing area with embossed header fields located at every predetermined recording unit, a playback signal detecting unit that detects the playback signal and a track error signal from information picked up by the pickup, and the servo driving unit that generates the servo driving signal from the track error signal.

7. A recording and/or reproducing apparatus, comprising:
   a sampling unit to sample a playback signal, from light reflecting off a recording medium, for a signal representing the presence of a header field;
   a comparing unit, comprising:
      a first comparator that compares the signal representing the presence of the header field with a first reference signal and outputs a first comparison signal;
      a second comparator that compares the signal representing the presence of the header field with a second reference signal and outputs a second comparison signal; and
      a logic gate that performs a logic operation on the first and second comparison signals; and
   a holding unit to hold the comparison signal to generate a header field signal for a servo driving unit to generate a servo driving signal to control a servo of the recording and/or reproducing apparatus.

8. The apparatus of claim 7, wherein the sampling unit comprises a high-pass filter that high-pass filters the playback signal and samples the signal representing the presence of a header field.

9. The apparatus of claim 7, wherein the recording medium is a DVD-RAM disc.

10. The apparatus of claim 7, wherein
   the logic gate comprises an OR gate that performs an OR operation on the first and second comparison signals.

11. The apparatus of claim 10, wherein the first reference level is set to be lower than a top level of the playback signal and the second reference level is set to be higher than a bottom level of the playback signal.

12. The apparatus of claim 10, wherein a holding period of the signal output by the comparing unit is set to be greater than a period of time from a point of time when the first comparison signal is output from the first comparator to a point of time when the second comparison signal is output from the second comparator.

13. The apparatus of claim 7, further comprising:
   a header field signal detecting unit comprising the sampling unit, the comparing unit, and the holding unit;
   a pickup that uses light to pick up information recorded on the recording medium having an embossed area and a recording/reproducing area with embossed header fields located at every predetermined recording unit;

a playback signal detecting unit that detects the playback signal and a track error signal from information picked up by the pickup; and a servo driving unit that generates a servo driving signal from the track error signal, and the header field signal detecting unit.

14. A method of controlling a servo in an optical recording and/or reproducing apparatus, the method comprising:

sampling a playback signal, from a pickup detecting light reflecting off a recording medium, for a signal representing the presence of a header field;

comparing the signal representing the presence of a header field with a reference level and holding the comparison result for a predetermined period of time to generate a header field signal; and generating a corrected tracking driving signal for a tracking of the recording medium which ignores the effect of a signal in the track error signal, generated by the pickup based on the light detected by the pickup, representing the presence of a header field, by holding an uncorrected tracking driving signal a period of time based on the header field signal.

15. The method of claim 14, wherein the recording and/or reproducing apparatus, comprises:

the pickup that uses light to pick up information recorded on the recording medium having an embossed area and a recording/reproducing area with embossed header fields located at every predetermined recording unit;

a playback signal detecting unit that detects the playback signal and the track error signal from information picked up by the pickup; and a tracking servo that generates the corrected and uncorrected tracking driving signal from the track error signal.

16. A method of controlling a servo for an optical recording and/or reproducing apparatus, the method comprising:

sampling a playback signal, from a pickup detecting light reflecting off a recording medium, for a signal representing the presence of a header field;

comparing the signal representing the presence of a header field with a reference level and holding the comparison result for a predetermined period of time to generate a header field signal;

generating a corrected tracking driving signal for a tracking of the recording medium which ignores the effect of a signal in the track error signal, generated by the pickup based on the light detected by the pickup, representing the presence of a header field, by holding an uncorrected tracking driving signal a period of time based on the header field signal, in a reproduction mode operation; and generating a track count signal by holding the track error signal based on the header field signal and generating a seek driving signal to pickup information from a desired track of the recording medium by using the track count signal, in a seek mode operation.

17. The method of claim 16, wherein the recording and/or reproducing apparatus comprises:

the pickup that uses light to pick up information recorded on the recording medium having an embossed area and a recording/reproducing area with embossed header fields located at every predetermined recording unit;

a playback signal detecting unit that detects the playback signal and the track error signal from information picked up by the pickup; and a tracking servo that generates the corrected and uncorrected tracking driving signal from the track error signal.

18. An apparatus for controlling a servo in an optical recording and/or reproducing apparatus, the apparatus comprising:

a header field signal detecting circuit to compare a signal, from a pickup detecting light reflecting off a recording medium and including a signal representing the presence of a header field signal, with a reference level, and to hold the comparison result for a predetermined period of time to generate a header field signal; and a tracking servo to generate a corrected tracking driving signal for tracking of the recording medium which ignores the effect of a signal in the track error signal, generated by the pickup based on light detected by the pickup, representing the presence of a header field, by holding an uncorrected tracking driving signal based on the header field signal.

19. The apparatus of claim 18, wherein the apparatus for controlling a servo is the recording and/or reproducing apparatus, which further comprises:

the pickup that uses light to pick up information recorded on the recording medium having an embossed area and a recording/reproducing area with embossed header fields located at every predetermined recording unit; and a playback signal detecting unit that detects the playback signal and the track error signal from information picked up by the pickup.

20. An apparatus for controlling a servo in an optical recording and/or reproducing apparatus, the apparatus comprising:

a header field signal detecting circuit to compare a signal, from a pickup detecting light reflecting off a recording medium and including a signal representing the presence of a header field signal, with a reference level, and to hold the comparison result for a predetermined period of time to generate a header field signal;

a tracking servo to generate a corrected tracking driving signal for tracking of the recording medium which ignores the effect of a signal in the track error signal, generated by the pickup based on light detected by the pickup, representing the presence of a header field, by holding an uncorrected tracking driving signal based on the header field signal, in a reproduction mode; and a seeking unit to generate a track count signal by holding a track error signal, generated by the pickup based on the light detected by the pickup, based on the header field signal, and to generate a seek driving signal to pickup information from a desired track of the recording medium by using the track count signal, in a seek mode.

21. The apparatus of claim 20, wherein the apparatus for controlling a servo is the recording and/or reproducing apparatus, which further comprises the pickup that uses light to pick up information recorded on the recording medium having an embossed area and a recording/reproducing area with embossed header fields located at every predetermined recording unit, and the playback signal detecting unit that detects the playback signal and the track error signal from information picked up by the pickup.

22. A medium comprising computer readable code controlling a computer to control the execution of the method of claim 1.

23. A medium comprising computer readable code controlling a computer to control the execution of the method of claim 14.

24. A medium comprising computer readable code controlling a computer to control the execution of the method of claim 16.

25. A medium comprising computer readable code controlling a computer to control the operation of the apparatus of claim 7.

26. A medium comprising computer readable code controlling a computer to control the operation of the apparatus of claim 18.

27. A medium comprising computer readable code controlling a computer to control the operation of the apparatus of claim 20.

28. The method of claim 1, wherein the predetermined time period is based on a period of time when the signal representing the header field is present in the playback signal.

29. The apparatus of claim 7, wherein the holding unit holds the comparison signal for a period of time based on a period of time when the signal representing the header field is present in the playback signal.

* * * * *

UNITED STATES PATENT AND TRADEMARK OFFICE
CERTIFICATE OF CORRECTION

| | | |
|---|---|---|
| PATENT NO. | : 7,224,647 B2 | Page 1 of 1 |
| APPLICATION NO. | : 10/624556 | |
| DATED | : May 29, 2007 | |
| INVENTOR(S) | : Yong-seok Yoon et al. | |

It is certified that error appears in the above-identified patent and that said Letters Patent is hereby corrected as shown below:

Column 8, line 11
change "Set" to --set--

Signed and Sealed this

Fourteenth Day of August, 2007

JON W. DUDAS
*Director of the United States Patent and Trademark Office*